US008861198B1

(12) United States Patent
Asuncion

(10) Patent No.: US 8,861,198 B1
(45) Date of Patent: Oct. 14, 2014

(54) DEVICE FRAME HAVING MECHANICALLY BONDED METAL AND PLASTIC

(75) Inventor: Bryan C. Asuncion, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 305 days.

(21) Appl. No.: 13/431,820

(22) Filed: Mar. 27, 2012

(51) Int. Cl.
G06F 1/16 (2006.01)

(52) U.S. Cl.
USPC .............. 361/679.55; 361/679.3; 361/679.56; 455/575.1

(58) Field of Classification Search
CPC ................ G06F 1/1626; G06F 1/1637; G06F 1/181–1/183
USPC ...................................................... 361/679.3
See application file for complete search history.

(56) References Cited

U.S. PATENT DOCUMENTS

| | | |
|---|---|---|
| 4,096,656 A | 6/1978 | Diceglie |
| 4,267,443 A | 5/1981 | Carroll et al. |
| 4,748,756 A | 6/1988 | Ross |
| 5,268,816 A | 12/1993 | Abell et al. |
| 5,414,413 A | 5/1995 | Tamaru et al. |
| 5,450,221 A | 9/1995 | Owen et al. |
| 5,579,035 A | 11/1996 | Beiswenger |
| 5,666,261 A | 9/1997 | Aguilera |
| 6,336,276 B1 | 1/2002 | Krajec et al. |
| 6,494,429 B2 | 12/2002 | Tajima |
| 6,560,124 B1 | 5/2003 | Irie et al. |
| 6,628,268 B1 | 9/2003 | Harada et al. |
| 6,829,854 B2 | 12/2004 | Reynolds |
| 6,882,108 B2 | 4/2005 | Kim et al. |
| 6,897,815 B2 * | 5/2005 | Goto et al. ..................... 343/702 |
| 7,224,121 B2 | 5/2007 | Ahn |
| 7,396,155 B2 * | 7/2008 | Oguchi .......................... 368/298 |
| 7,436,657 B2 | 10/2008 | Motai et al. |
| 7,457,120 B2 | 11/2008 | Bae et al. |
| 7,480,502 B2 * | 1/2009 | Biddulph ....................... 455/416 |
| 7,880,732 B2 | 2/2011 | Goertz |
| 8,106,786 B2 | 1/2012 | Kim et al. |
| 8,107,259 B2 * | 1/2012 | Hirota et al. .................. 361/814 |
| 8,125,771 B2 | 2/2012 | Yukawa et al. |
| 8,346,183 B2 * | 1/2013 | Prest et al. .................... 455/90.3 |
| 8,570,729 B2 * | 10/2013 | Prest et al. ................... 361/679.3 |
| 8,587,939 B2 * | 11/2013 | McClure et al. ............. 361/679.3 |
| 2003/0189520 A1 * | 10/2003 | Goto et al. ..................... 343/702 |
| 2004/0114318 A1 * | 6/2004 | Nuovo et al. ................. 361/683 |
| 2004/0233127 A1 | 11/2004 | Niitsu et al. |
| 2005/0057915 A1 | 3/2005 | Tsai |
| 2005/0104860 A1 | 5/2005 | McCreary et al. |
| 2005/0243106 A1 | 11/2005 | Bae et al. |
| 2006/0028790 A1 | 2/2006 | Baek |
| 2007/0236908 A1 | 10/2007 | Yukawa et al. |

(Continued)

OTHER PUBLICATIONS

Non-Final Office Action for U.S. Appl. No. 13/431,825, mailed Mar. 20, 2014.

Primary Examiner — Anthony Q Edwards
(74) Attorney, Agent, or Firm — Lowenstein Sandler LLP

(57) ABSTRACT

A frame for a mobile device includes a metal region and a plastic region. The metal region has a plurality of sides, wherein at least one side of the plurality of sides comprises a plurality of voids. The plastic region comprises glass impregnated plastic and has a mechanical bond to the at least one side of the metal region, wherein the mechanical bond is achieved via protrusions of the plastic region that fill the plurality of voids in the at least one side.

20 Claims, 12 Drawing Sheets

(56) References Cited

U.S. PATENT DOCUMENTS

| | | |
|---|---|---|
| 2007/0258199 A1 | 11/2007 | Jeong |
| 2008/0019502 A1* | 1/2008 | Emmert et al. .......... 379/433.07 |
| 2008/0227507 A1* | 9/2008 | Joo ............................ 455/575.8 |
| 2008/0247127 A1 | 10/2008 | Finnegan |
| 2009/0009944 A1 | 1/2009 | Yukawa et al. |
| 2009/0130995 A1* | 5/2009 | Wang Chen ................. 455/90.3 |
| 2010/0075719 A1* | 3/2010 | Tomioka et al. .............. 455/566 |
| 2010/0315379 A1 | 12/2010 | Allard et al. |
| 2011/0043826 A1 | 2/2011 | Kiyose |
| 2011/0134064 A1 | 6/2011 | Goertz |
| 2011/0176082 A1 | 7/2011 | Allard et al. |
| 2011/0210946 A1 | 9/2011 | Goertz et al. |
| 2012/0133560 A1* | 5/2012 | Tang ............................ 343/702 |
| 2012/0194997 A1* | 8/2012 | McClure et al. ......... 361/679.55 |
| 2013/0021280 A1* | 1/2013 | Dabov et al. ................... 345/173 |
| 2013/0147079 A1* | 6/2013 | Ji et al. ......................... 264/105 |
| 2013/0190052 A1* | 7/2013 | Lundell ........................ 455/566 |
| 2013/0328462 A1* | 12/2013 | Pakula et al. .............. 312/223.1 |

* cited by examiner

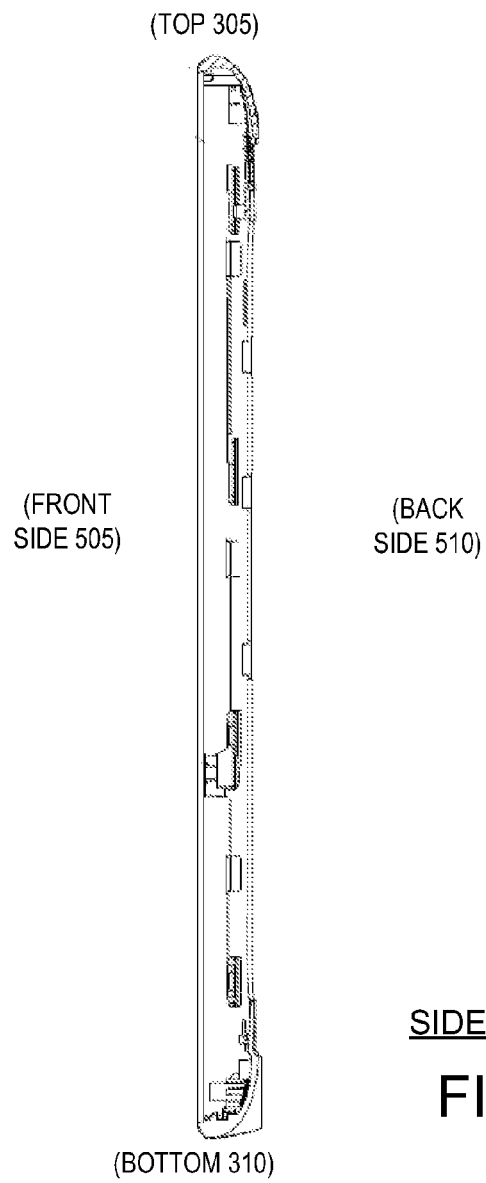
SIDE VIEW 500
FIG. 5
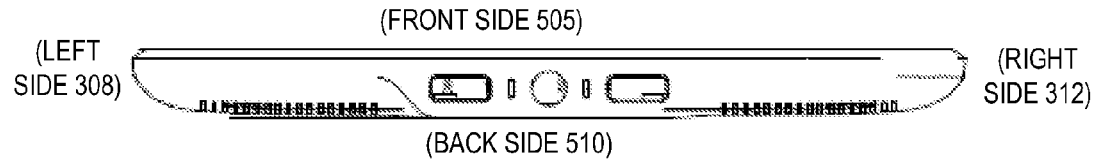
BOTTOM VIEW 600     FIG. 6

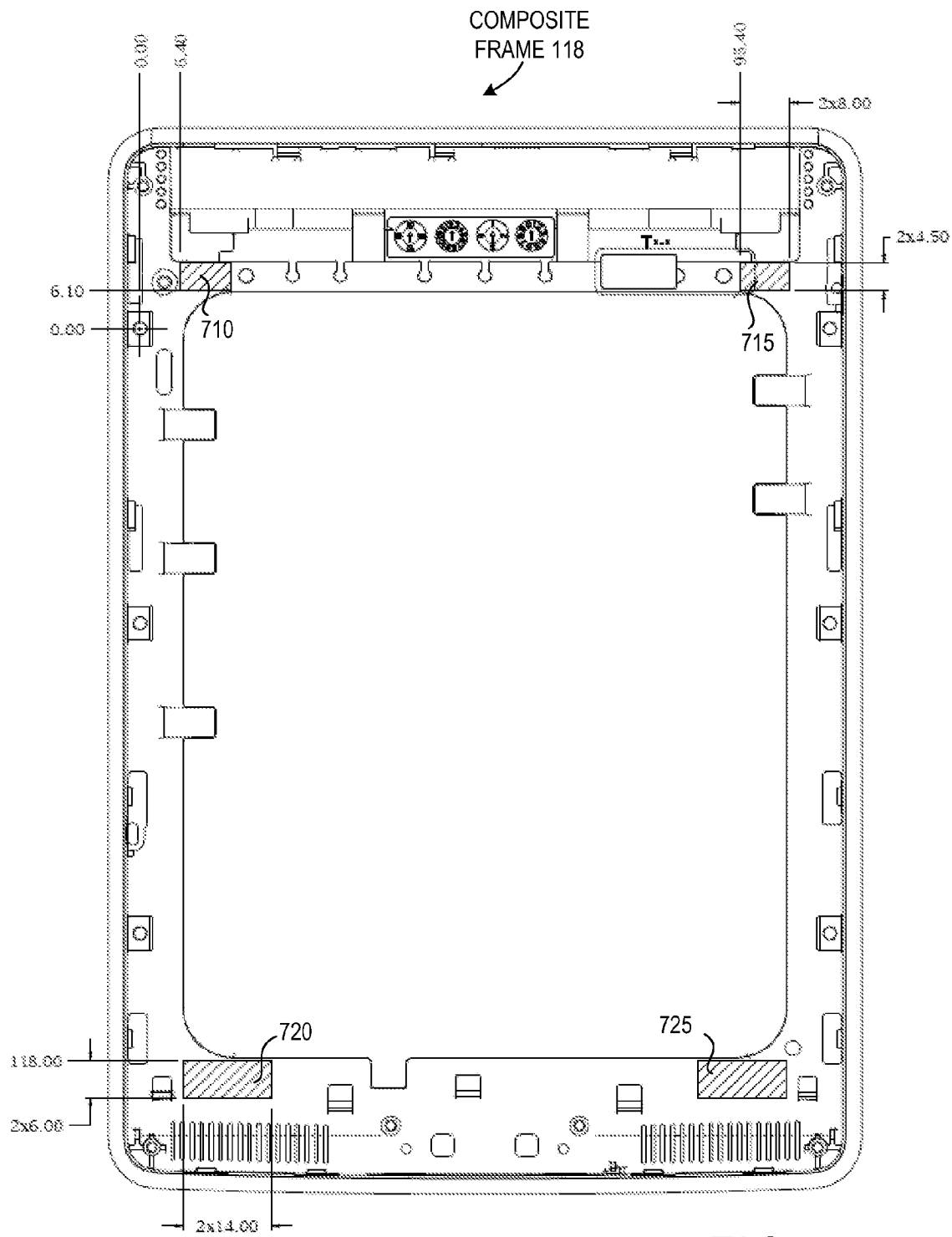
FRONT VIEW 700  FIG. 7

FRONT VIEW 900

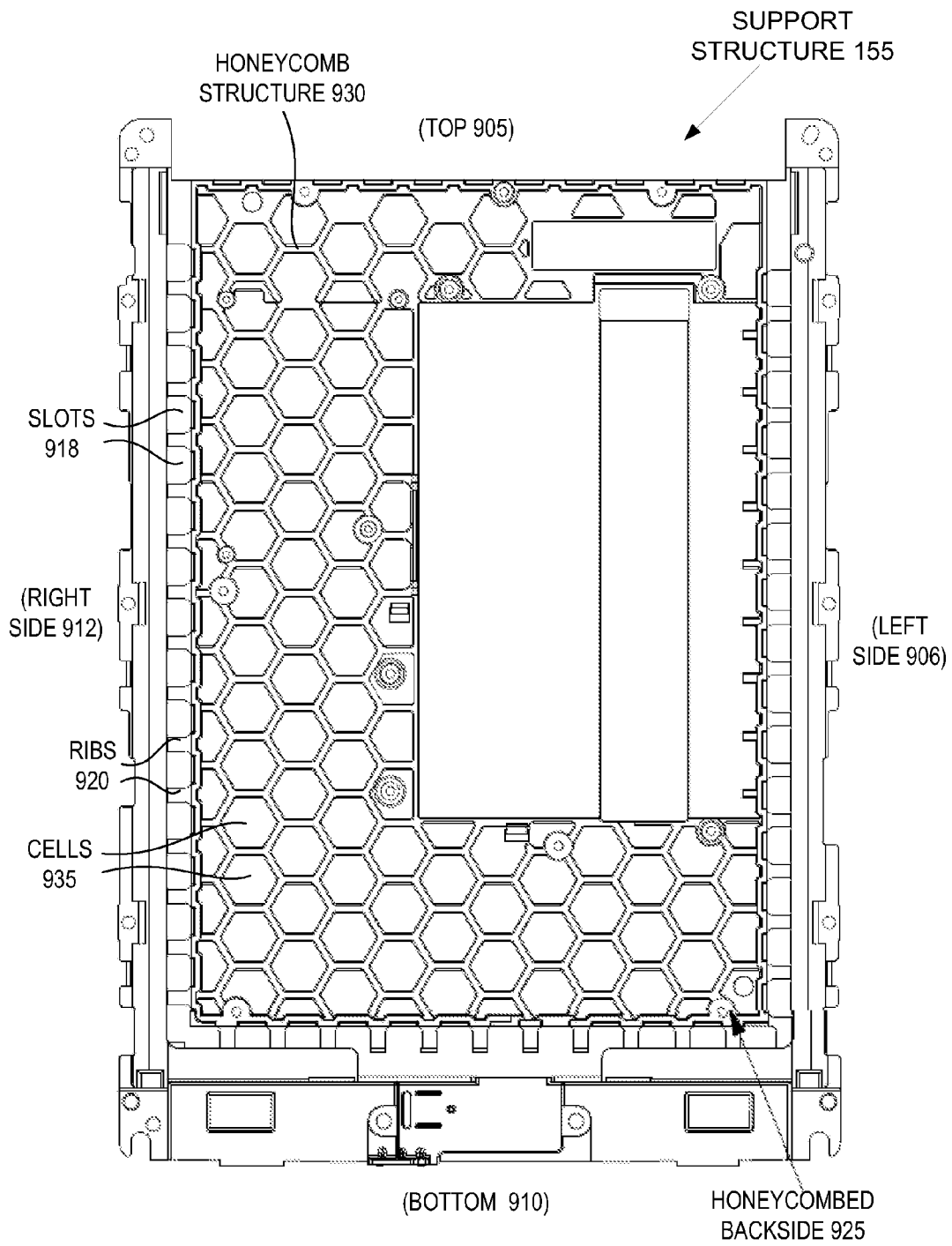
BACK VIEW 1000  FIG. 10

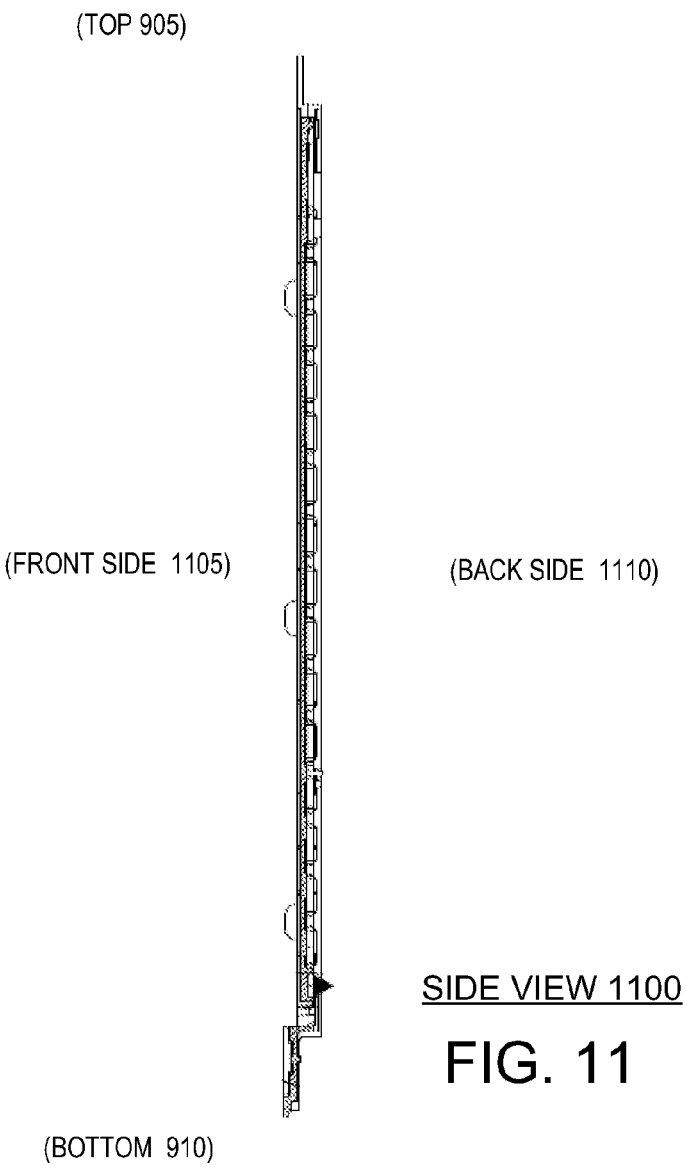
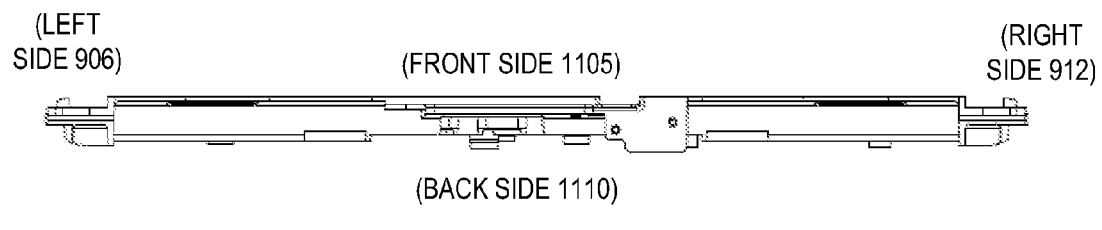

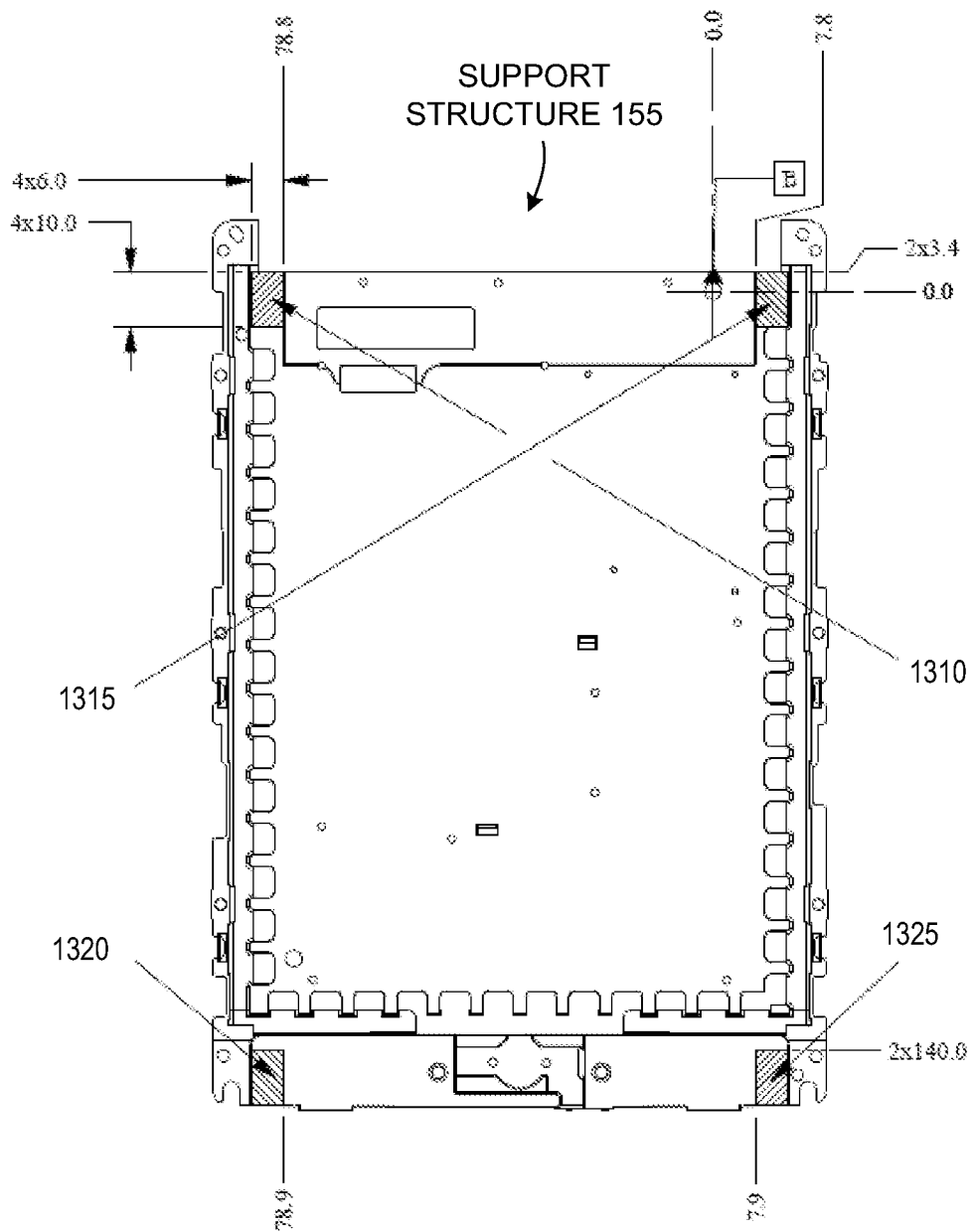
FRONT VIEW 1300   FIG. 13

DEVICE FRAME HAVING MECHANICALLY BONDED METAL AND PLASTIC

This application is related to co-pending U.S. application Ser. No. 13/431,825 filed Mar. 27, 2012, which is assigned to the assignee of the present application.

BACKGROUND OF THE INVENTION

The use of mobile electronic devices has become pervasive in society. It is often desirable for such mobile electronic devices to be as light as possible while retaining beneficial structural properties such as high rigidity and material strength. However, materials such as metals and carbon fibers that provide the best combination of weight, rigidity and strength may have detrimental effects to transmitted or received radio signals.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 5 illustrates a side view of a composite frame, in accordance with one embodiment of the present invention.

FIG. 6 illustrates a bottom view of a composite frame, in accordance with one embodiment of the present invention.

FIG. 7 illustrates a front view of the composite frame showing locations from which electrical resistance measurements can be taken, in accordance with one embodiment of the present invention.

FIG. 10 illustrates a back view of a support structure, in accordance with one embodiment of the present invention.

FIG. 11 illustrates a side view of a support structure, in accordance with one embodiment of the present invention.

FIG. 12 illustrates a bottom view of a support structure, in accordance with one embodiment of the present invention.

FIG. 13 illustrates a front view of the support structure showing locations to from which to take electrical resistance measurements, in accordance with one embodiment of the present invention.

DETAILED DESCRIPTION OF THE PRESENT INVENTION

Structures for use in mobile electronic devices (also referred to herein simply as mobile devices) and processes for manufacturing such structures are described herein. The mobile devices may be any content rendering devices that include a wireless modem for connecting the mobile devices to a wireless network. Examples of such mobile devices include electronic book readers, cellular telephones, personal digital assistants (PDAs), portable media players, tablet computers, netbooks, and the like.

In one embodiment, a mobile device includes a composite frame that includes both metal and plastic. The composite frame may include a metal region having multiple sides and a hollow center. At least one side of the metal region has multiple voids. The metal region may be formed by metal die casting. The composite frame further includes a plastic region composed of glass impregnated plastic. The plastic region is mechanically bonded to the metal region. The bond is achieved via protrusions of the plastic region that fill the voids in the at least one side of the metal region. The plastic region, including the regions that fill the voids in the metal region, may be formed on the metal region via a plastic injection molding process.

In one embodiment, a mobile device includes a metal internal support structure. The support structure may have a substantially flat front side configured to support a display (e.g., a fragile display such as a glass display) and a latticed (e.g., honeycombed) back side configured to provide rigidity to the mobile device while keeping a weight below a weight threshold. The latticed back side may also be configured to support a logic board (e.g., a main logic board (MLB)) and/or a battery. The support structure may additionally include a series of ribs around a periphery of the support structure. These ribs may be configured to permit emitters for an infrared touch sensor mounted on the logic board to project infrared beams to receivers also mounted on the logic board.

Note that when the terms "about" and "approximately" are used herein, this is intended to mean that the nominal value presented is precise within ±10%.

Figure 1:
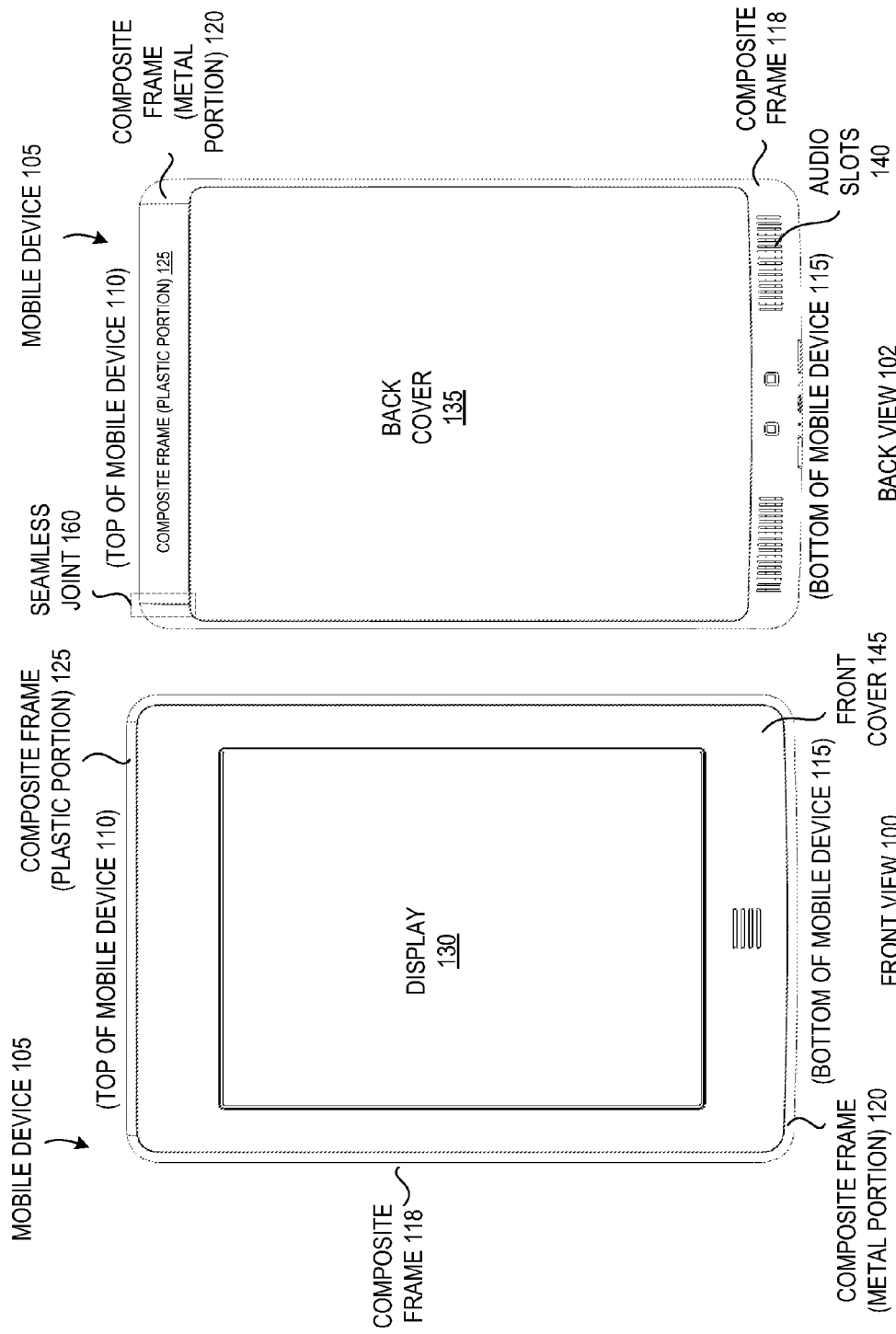
FIG. 1 illustrates an exemplary mobile device, in accordance with one embodiment of the present invention.

FIG. 1 illustrates a front view 100 and a back view 102 of an exemplary mobile device 105, in accordance with one embodiment of the present invention. The mobile device 105 may be configured with functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The mobile device 105 may include any type of content rendering device such as an electronic book reader, portable digital assistant, mobile phone, laptop computer, portable media player, tablet computer, camera, video camera, netbook, notebook, and the like.

The mobile device 105 includes internal components such as a main logic board (MLB), processors (e.g., one or more CPUs, microcontrollers, field programmable gate arrays, or other types of processors), system memory (e.g., volatile and/or non-volatile storage mechanisms), data storage devices, speakers, a wireless modem, an antenna, a battery, and so forth. These internal components may be attached to a composite frame 118, which may have externally visible portions (e.g., those portions shown in FIG. 1) as well as internal potions that are not visible when the mobile device is assembled. The internal components may also, or alternatively, be attached to an internal metal support structure (not shown), which is described in greater detail below. The metal support structure may be coupled to the composite frame 118, such as with screws, rivets, clips, adhesives or other fasteners.

The composite frame 118 may include a metal portion 120 and a plastic portion 125 that is mechanically bonded to the metal portion 120. The plastic portion 125 may join the metal portion 120 at a joint 160 that is approximately seamless. As used herein, the term "approximately seamless joint" means a joint that may not be immediately discernible to the naked eye, and may be difficult to detect by touch. For example, there may be no ridges, bumps, to other detectable features at the joint 160 to indicate to a user where the metal portion 120 ends and the plastic portion 125 begins.

The mobile device 105 may include a wireless modem (not shown) and wireless antenna (not shown) coupled to the wireless modem for communicating with a wireless network and/or other mobile devices. The wireless modem allows the mobile device 105 to communicate via a wireless network with other computing devices, such as remote computers, servers, other mobile devices, and so forth. The wireless modem may allow the mobile device 105 to handle both voice and non-voice communications (such as communications for text messages, multimedia messages, media downloads, web browsing, etc.) with a wireless network. The wireless modem may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed down-link packet access (HSDPA), WiFi, etc.

Notably, metal impedes performance of transmission and reception of radio signals. Accordingly, the plastic portion 125 of the composite frame 118 is used to cover the antenna. By using metal for a majority of the composite frame 228 and plastic for the portion of the composite frame 118 that will cover the wireless antenna, an optimal combination of rigidity, structural strength and radio signal quality (e.g., signal to noise ratio, signal strength, etc.) can be achieved.

A front cover 145 may be connected to a front side of the composite frame 118. The front cover 145 may be enclosed on four sides by the composite frame 118, and may itself surround a display 130. Additionally, a back cover 135 may be connected to a backside of the composite frame 118, and may also be enclosed on four sides by the composite frame 118.

The display 130 may be framed by the front cover 145 and/or the composite frame 118. The display 415 may use any available display technology, such as electronic ink (e-ink), liquid crystal display (LCD), transflective LCD, light emitting diodes (LED), laser phosphor displays (LSP), and so forth. In one embodiment, the display 130 is a fragile display such as a glass display or a glass backed display. Accordingly the display 130 may be mounted to a front of a metal support structure (not shown) that is internal to the mobile device 105 to provide support and rigidity to the display 130.

In one embodiment, the display 130 is a touch sensitive display (e.g., a touch screen). Accordingly, the display 130 may act as an input device. The touch sensitive display may operate using any touch detection techniques. For example, the mobile device 105 may include optical (e.g., infrared) sensors that use an emitter and receiver pair to detect the presence of opaque objects (e.g., human fingers or a stylus) on the display 130. An emitter may be located at one end of the display 130, and a corresponding receiver may be located at an opposite end of the display 130. The emitter may project an infrared beam through a light guide to the receiver. An interruption of the infrared beam may indicate the presence of a human finger or stylus.

The mobile device 105 may also include capacitive sensors that are configured to measure capacitance generated by the presence of the human body part using any one of various techniques known in the art, such as relaxation oscillation, a current verses voltage phase shift comparison, resistor-capacitor charge timing, capacitive bridge division, charge transfer, sigma-delta modulation, or charge-accumulation. Alternatively, the sensors may be inductive sensors, which include an inductive loop. When the presence of a human body part (or metal object) is brought close to the inductive sensor, an induction of the inductive loop changes, causing the human body part to be detected. Alternatively, the sensors may be ultrasonic sensors that emit an ultrasonic signal and measure a time duration between when a signal is transmitted and the reflection of that signal received (a.k.a., flight response). The sensors may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used.

In one embodiment, the metal portion 120 of the composite frame 118 includes a series of audio slots 140. The audio slots 140 may cover and protect internal speakers (not shown) included in the mobile device 105. In one embodiment, the audio slots have a spacing of 2 mm, and are 1 mm thick. Audio slots 140 with these dimensions may permit sounds to be passed though the composite frame 118 with minimal distortion or muffling, and may be accurately producible via a metal die cast process.

Figure 2:
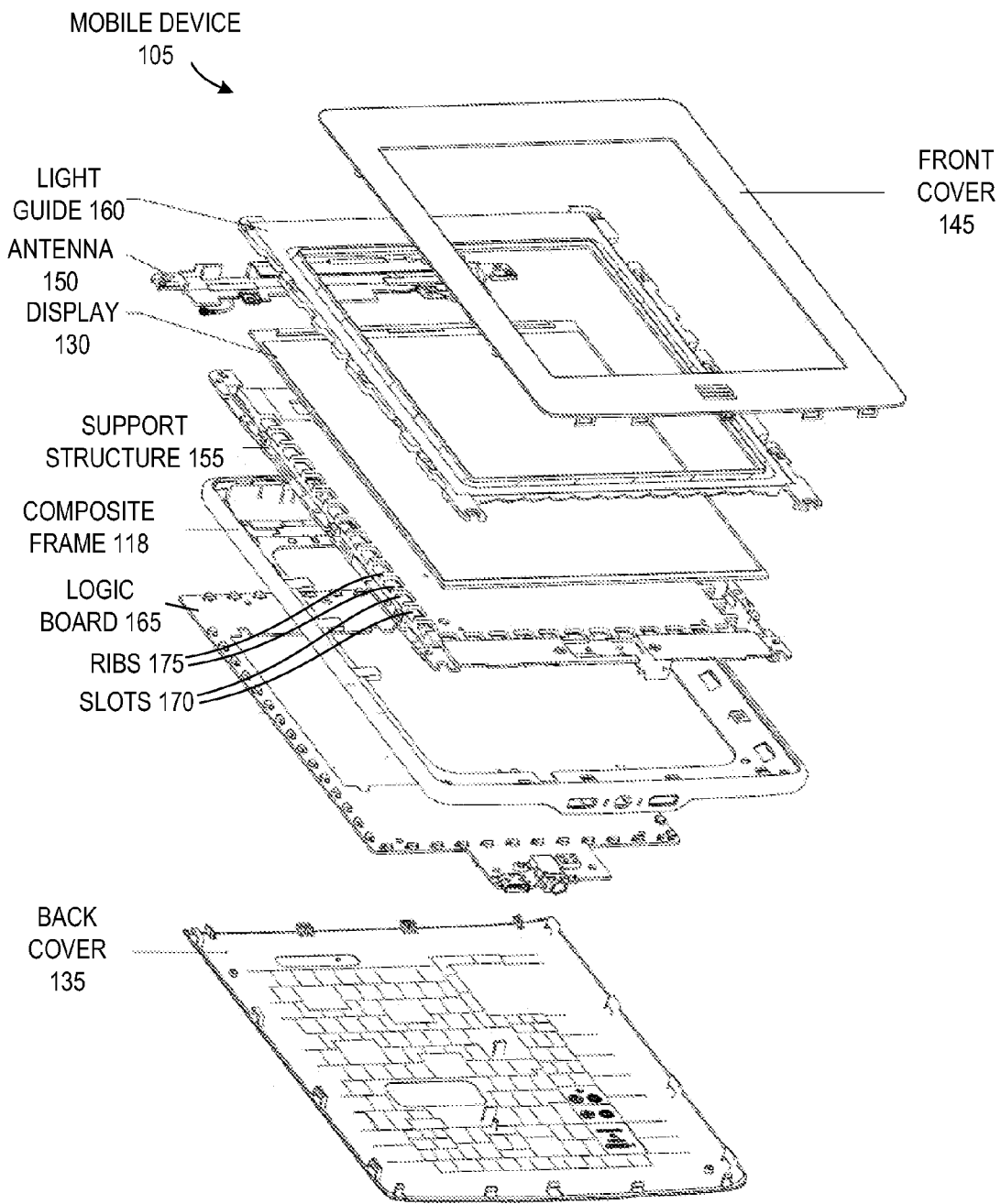
FIG. 2 illustrates structural components of the mobile device shown in FIG. 1, in accordance with one embodiment of the present invention.

FIG. 2 illustrates an assembly diagram of the structural components of the mobile device 105 shown in FIG. 1, in accordance with one embodiment of the present invention. In one embodiment, the structural components that form the mobile device 105 include a front cover 145, light guide 160, antenna 150, structural support 155, composite frame 118, logic board 165 and back cover 135. The composite frame 118 and support structure 155 may provide most of the support and rigidity for the mobile device 105.

The display 130 and/or light guide 160 may be mounted to a substantially flat front side of the support structure 155, such as with an adhesive. The support structure 155 may be a rigid structure that is resistant to flexing and/or bending. Thus, the support structure 155 may protect the display 130 and/or light guide 160. In one embodiment, the front side of the support structure 155 is flat. Alternatively, the front side may have a curve that is substantially matched by a curve in the display.

A logic board 165 and/or a battery (not shown) may also be mounted to a back side of the support structure 155. The logic board 165 may include a printed circuit board, on which a wireless modem, processors, memory, data storage devices, touch sensors (e.g., IR emitters and receivers), and so forth may be mounted. In one embodiment, the support structure 155 includes a series of slots 170 and ribs 175 along a periphery of the support structure 155. Each slot 170 may be formed by two adjacent ribs 175. The touch sensors (e.g., IR emitters and receivers) may at least partially fill these slots 170. For example, IR emitters may project IR beams through a slot 170 and into light guide 160 mounted to a front of the support structure 155. The light guide 160 may guide the IR beam through the display 130, through another slot 170 at an opposite side of the support structure 155, and into an IR receiver. Accordingly, the slots 170 may enable touch sensors at a back side of the support structure 155 to detect objects on the display 130 on a front side of the support structure 155.

A wireless antenna 150 may additionally be coupled to the support structure 155. The antenna 150 may be attached to one end (e.g., a top end) of the support structure 155 at a region that will be covered by a plastic portion of the composite frame 118. The antenna 150 may transmit radio signals that radiate through the plastic portion of the composite frame 118. Accordingly, the antenna 150 may be able to transmit and receive radio signals with minimal or no signal degradation.

Some or all of the logic board 165, antenna 150, display 130, battery, speakers, light guide 160 and/or additional electronic components may be attached to the support structure 155 to form a sub-assembly. This sub-assembly may be tested as a single unit. If the sub-assembly passes quality control tests, then the sub-assembly may be attached to the composite frame 118. A back cover 135 and front cover 145 may then be attached to the composite frame 118 to fully assemble the mobile device 105.

Figure 3:
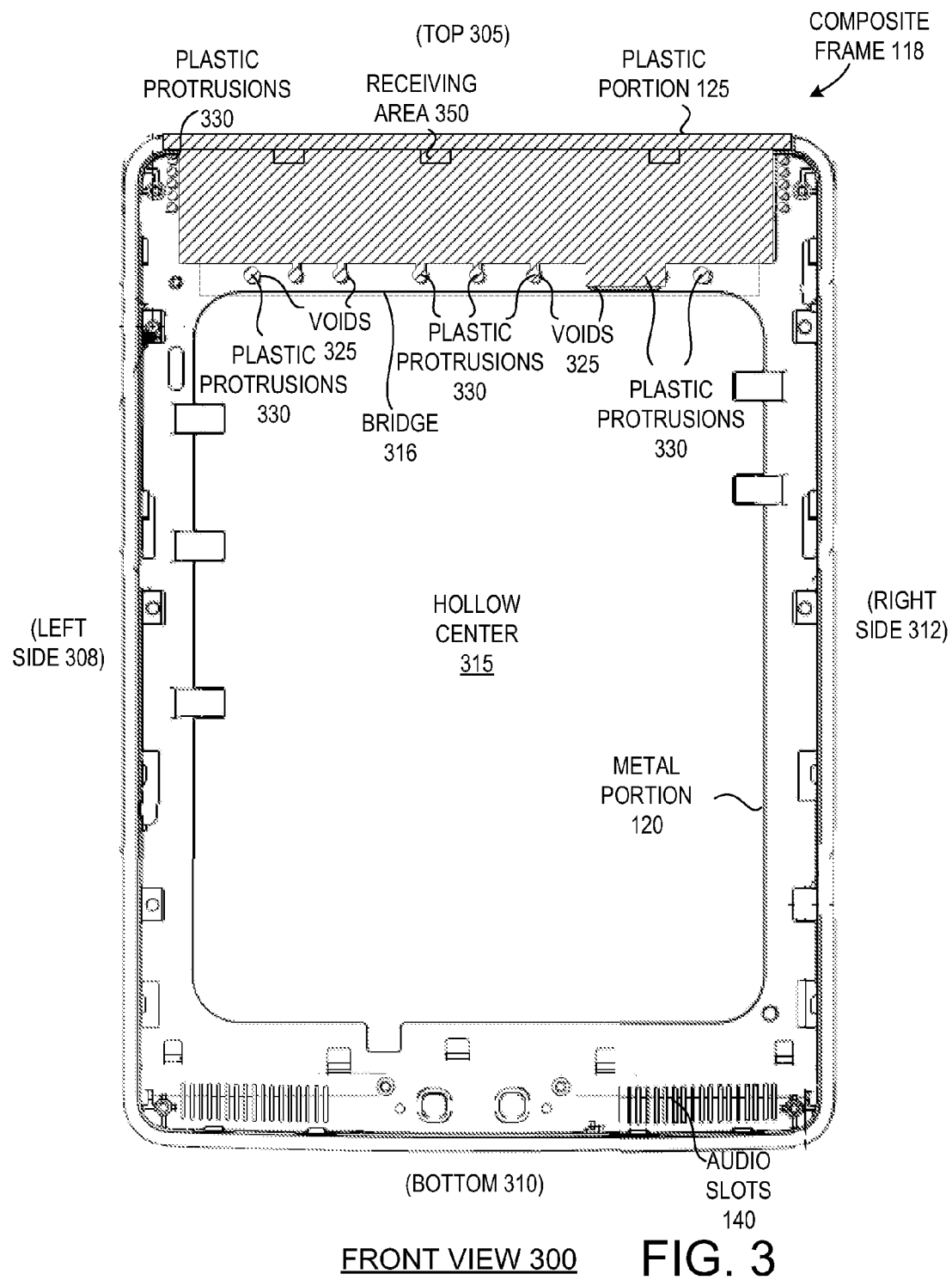
FIG. 3 illustrates a front view of a composite frame, in accordance with one embodiment of the present invention.
Figure 4:
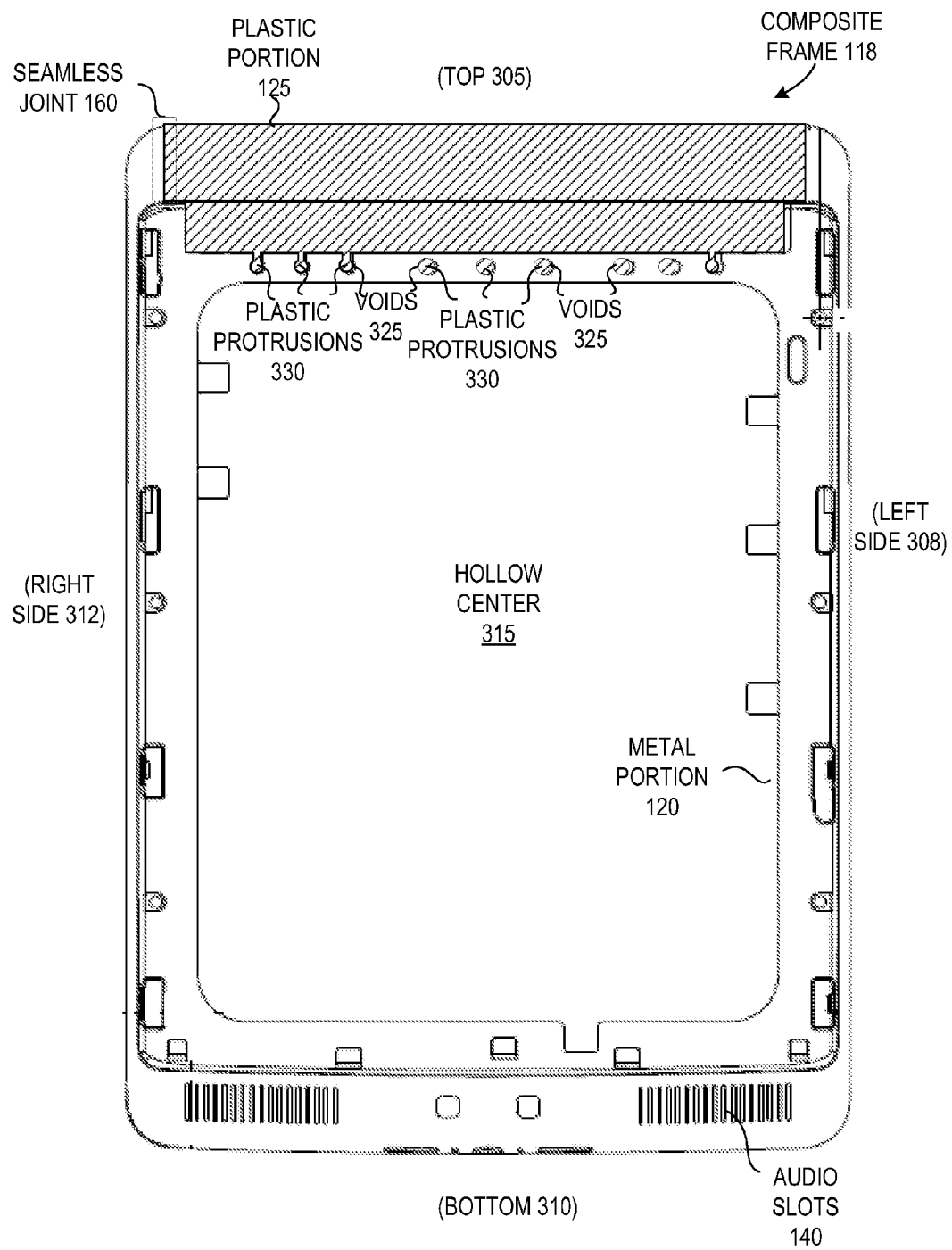
FIG. 4 illustrates a back view of a composite frame, in accordance with one embodiment of the present invention.

FIGS. 3-6 illustrate multiple views of the composite frame 118 shown in FIG. 1, in accordance with embodiments of the present invention. FIG. 3 illustrates a front view 300 of the composite frame 118, FIG. 4 illustrates a back view 400 of the composite frame 118, FIG. 5 illustrates a side view 500 of the composite frame 118, and FIG. 6 illustrates a bottom view 600 of the composite frame 118, in accordance with embodiments of the present invention.

As shown, the composite frame 118 is primarily composed of a metal portion 120. In one embodiment, the metal portion 120 is aluminum, magnesium, or a combination of the two. The metal portion 120 may also be an alloy with aluminum and/or magnesium. Alternatively, the metal portion 120 may be other types of metals such as steel, copper, nickel, brass, zinc, and so forth.

A bottom side 310, left side 308 and right side 312 of the composite frame 118 may be composed of the metal portion 120. The metal portion 120 may additionally include a bridge 316 at or near a top side 305 of the composite frame 118. The bridge 316 may include multiple voids 325. Additional voids may also be formed in the left side 308 and right side 312 of the metal portion 120 near the top 305. In one embodiment, a center of the composite frame 118 is hollow 315. The bottom 310 of the composite frame 118 may include the audio slots 140.

The plastic portion 125 of the composite frame 118 is mechanically joined to the metal portion 120 at the top 305 of the composite frame 118. The plastic portion 125 includes multiple protrusions 330 that fill the voids 325 in the metal portion 120. For example, the plastic protrusions 330 may fill voids 325 on the bridge 316, as well as on the left side 308 and right side 312 of the composite frame near the top 305 of the composite frame 118. The plastic protrusions 330 may conform to a shape of the voids 325, forming a mechanical bond between the metal portion 120 and the plastic portion 125.

The plastic portion 125, including the plastic protrusions 330, may be formed on the metal portion 120 using a plastic injection molding process. For example, the metal portion 120 may be placed in an insert molding machine, which may form the plastic portion 125 on the metal portion 120. In one embodiment, the plastic portion 125 is a glass impregnated plastic. The glass impregnated plastic may have glass fibers that make up approximately 30% to 70% of the plastic portion by volume. In one embodiment, the glass fibers make up 50% of the plastic portion 125 by volume.

In one embodiment, the plastic portion 125 includes multiple receiving areas 350. Each receiving area 350 is configured to accept a hook from a front cover. The hooks may attach to the receiving areas 350 to cause the front cover to couple to the composite frame 118. The receiving areas 350 may additionally provide support to the front cover. The plastic portion 215 may also include multiple ribs (not shown) that provide rigidity to the plastic portion and that support the front cover.

FIG. 7 illustrates another front view 700 of the composite frame 118 showing locations from which electrical resistance measurements can be taken, in accordance with one embodiment of the present invention. As shown, electrical resistance measurements may be taken from locations 710-725, which may be near four corners of the metal region of the composite frame 118. In one embodiment, the composite frame 118 has a specific electrical resistance of less than 2 ohms when measured from locations 710-725.

Figure 8:
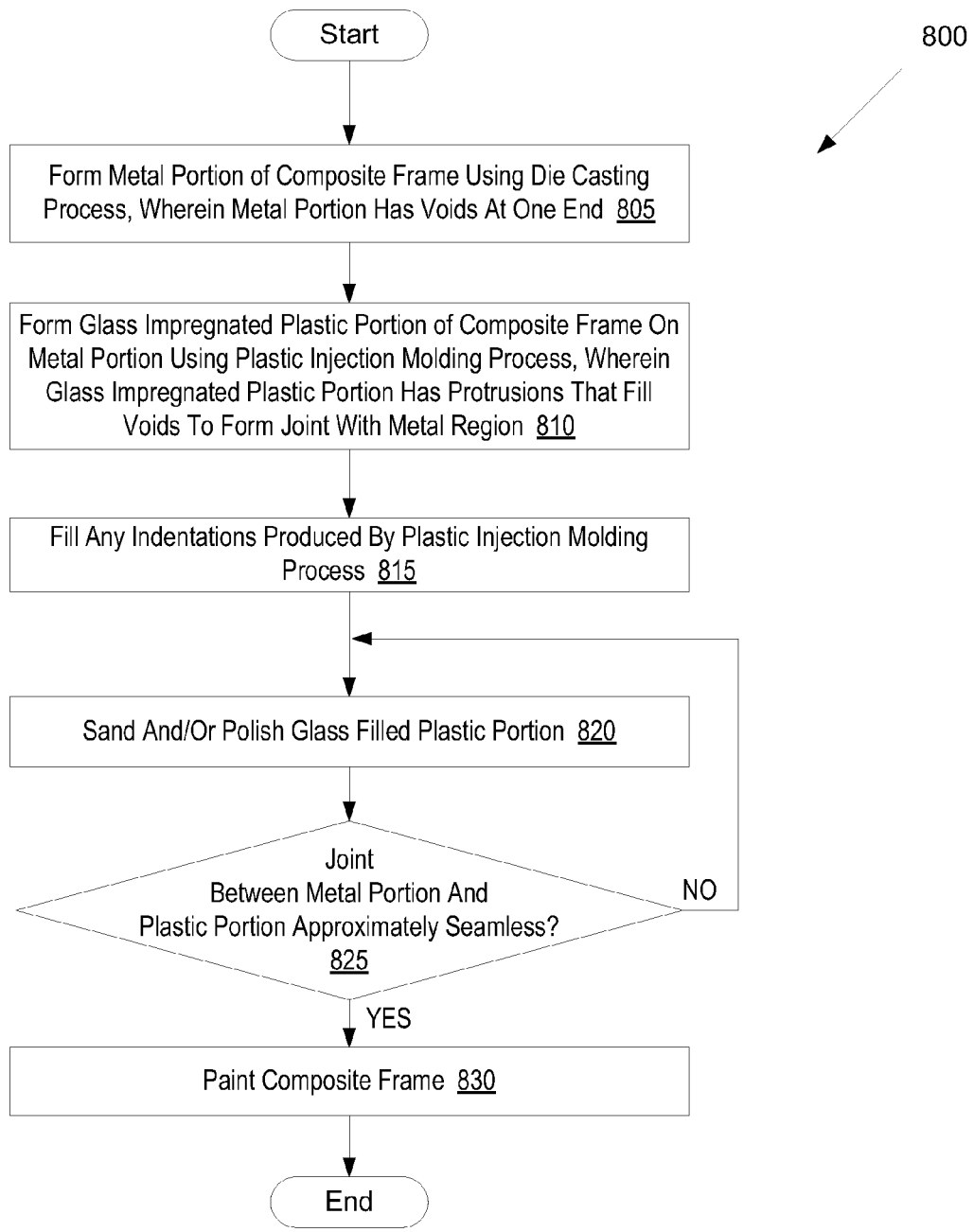
FIG. 8 is a flow diagram showing one embodiment of a process for manufacturing a composite frame.

FIG. 8 is a flow diagram showing one embodiment of a process 800 for manufacturing a composite frame. At block 805 of process 800 a metal portion of the composite frame is formed using a die casting process. The die casting process is performed by forcing molten metal under high pressure into a mold cavity. The metal portion includes multiple voids at one end. The metal portion may also include multiple audio slots at another end. In one embodiment, a top of the metal portion includes a bridge that bridges a left side of the metal portion to a right side of the metal portion. The bridge may include voids. Additionally, a left side and right side of the metal portion at a top of the metal portion may include voids.

At block 810, the metal portion of the composite frame is inserted into a mold (e.g., an insert molding machine). A plastic injection molding process is then used to form a plastic portion of the composite frame on the metal portion. This may include feeding material (e.g., a thermoplastic or thermosetting plastic and/or glass fibers) into a heated barrel, mixing the material, and forcing the material into a mold cavity where it cools and hardens to the configuration of the cavity. Some common polymers that may be used to form the plastic portion include epoxy, phenolic, nylon, polyethylene, polystyrene and thermoplastic. The injection molding process may cause multiple protrusions of the plastic portion to form that fill the voids in the metal portion. These protrusions and voids may together form a joint between the metal portion and the plastic portion of the composite frame. This may be a mechanical joint that is achieved without any adhesives or fasteners such as screws, rivets, etc.

In one embodiment, the plastic portion is formed of a glass impregnated plastic. The glass impregnated plastic may include glass fibers suspended in plastic. The glass fibers may increase a strength and rigidity of the plastic portion. However, the glass fibers may start to interfere with radio signals beyond certain percentages of glass fibers. Additionally, if too high a level of glass fibers is used, a mold used to create the plastic portion may be damaged. Accordingly, a percentage of glass fibers to include in the plastic portion may be determined based on specified radio frequencies to be used, specified transmission and/or reception properties, and/or a specified rigidity and/or structural strength. In one embodiment, glass fibers may make up approximately 30% to 70% of the plastic portion by volume.

The plastic injection molding process may cause a number of imperfections in the plastic portion. These imperfections may include rough edges, pores, indentations and/or divots, bumps or ridges, and so forth. However, the composite frame may be used as an externally visible and touchable portion of a mobile device. Accordingly, at block 815 any imperfections (e.g., voids, pores, indentations, divots, etc.) produced by the plastic injection mold process are filled. Additionally, at block 820 the plastic portion is sanded and/or polished the remove any additional imperfections. The sanding and polishing may also eliminate any seams at the joints between the metal portion and the plastic portion to produce an approximately seamless joint between the metal portion and the plastic portion.

At block 825, it may be determined whether all joints between the metal portion and the plastic portion are approximately seamless. If seams are still detectable at any joints, the method returns to block 820. Otherwise, the method proceeds to block 830. At block 830, the composite frame is painted. The paint may be applied uniformly over the metal portion and the plastic portion. After the paint has been applied, the metal portion and plastic portion may be visually indistinguishable from one another. Additionally, these portions may be approximately tactilely indistinguishable from one another.

Figure 9:
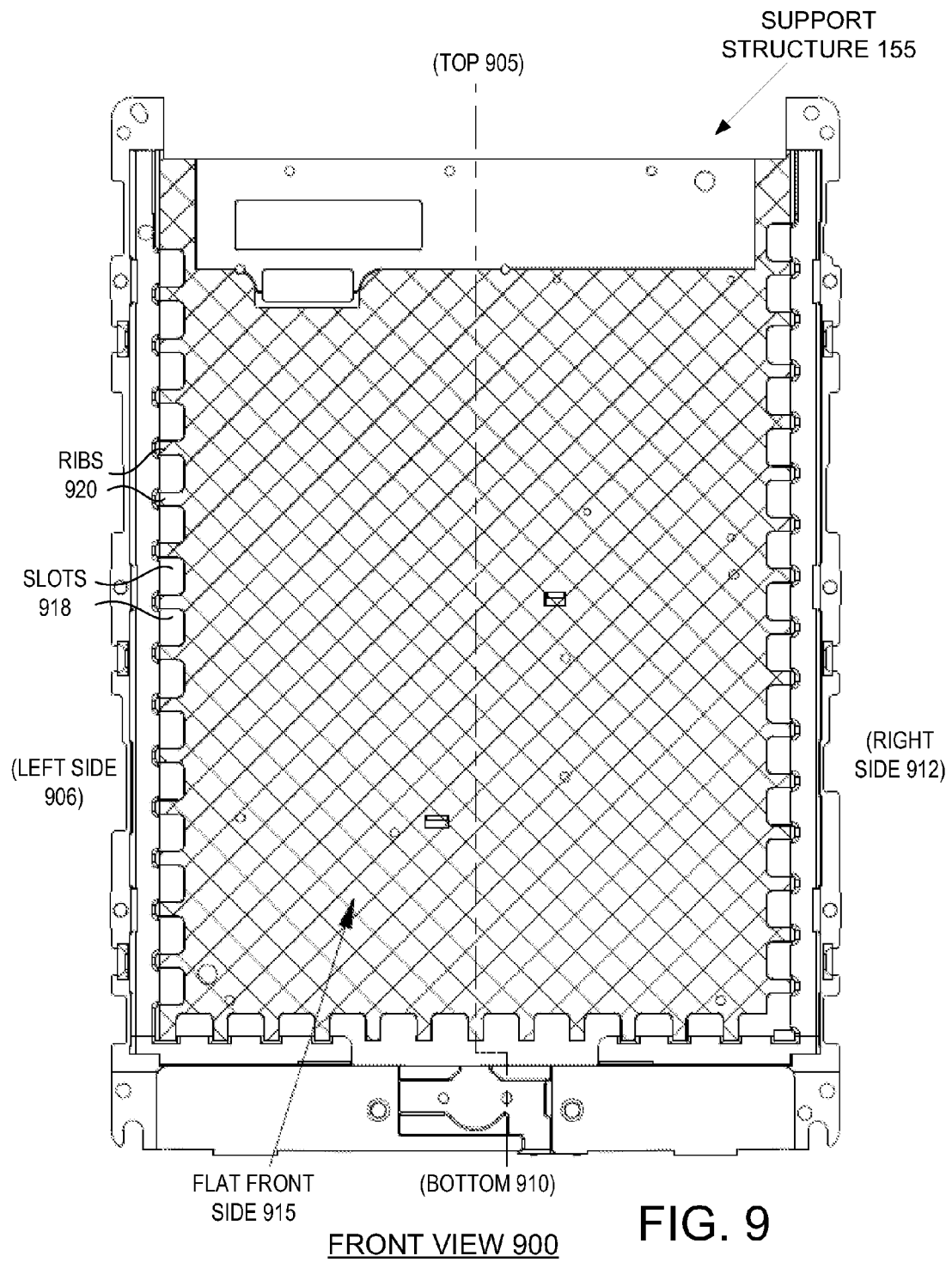
FIG. 9 illustrates a front view of a support structure, in accordance with one embodiment of the present invention.

FIGS. 9-13 illustrate multiple views of the support structure 155 shown in FIG. 1, in accordance with embodiments of the present invention. FIG. 9 illustrates a front view 900 of the support structure 155, FIG. 10 illustrates a back view 1000 of the support structure, FIG. 11 illustrates a side view 1100 of the support structure 155, and FIG. 12 illustrates a bottom view 1200 of the support structure 155, in accordance with embodiments of the present invention. Additionally, FIG. 13 illustrates another front view 1300 of the support structure 155 showing locations 1310-1325 from which to take electrical resistance measurements, in accordance with one embodiment of the present invention.

As shown, the support structure 155 has an approximately flat front side 915. The flat front side 915 may have roughly the same dimensions as a display that will be mounted to the flat front 915. The support structure 155 also has a latticed back side 925. The latticed back side 925 has a raised lattice structure 930 that is connected to the flat front side 915. Inside the lattice structure 930 are numerous cells 935. The cells 935 have a lesser thickness than walls of the lattice structure 930. The latticed back side 925 increases a rigidity of the support structure 155 with use of a minimal amount of additional material, thus minimizing a weight of the support structure 155. In one embodiment, the use of the latticed back side 925 keeps the weight of the support structure 155 below a weight threshold of approximately 16 ounces. In another embodiment, the use of the latticed back side 925 keeps the weight of the support structure 155 below a weight of approximately 10 ounces.

In one embodiment, the lattice structure 930 is a honeycomb structure (e.g., a hexagonal lattice structure). Alternatively, the lattice structure 930 may be, for example, a triangular lattice structure (e.g., an equilateral triangular lattice structure), a pentagonal lattice structure, or other polygonal lattice structure. The lattice structure 930 may have walls with thicknesses ranging from approximately 0.1 mm to approximately 10 mm and with a height ranging from approximately 0.1 mm to approximately 10 mm.

In one embodiment, the support structure 155 has a specified electrical resistance. The resistance may be approximately 2 ohms or below, when electrical resistance measurements are taken from locations 1310-1325. The specified resistance may be selected to permit the touch sensors (e.g., IR emitters and receivers) to properly function. The resistance may be controlled by adjusting a thickness of the support structure 155, a size and spacing of the lattice structure 930 and/or a thickness of the lattice structure 930. The thickness of the support structure 155 and parameters of the lattice structure 930 may also be selected based on specified weight and rigidity. In one embodiment, the thickness of the support structure 155 and parameters of the lattice structure 930 are selected based on a specified weight, electrical resistance and rigidity. In one embodiment, the support structure 155 has a thickness of approximately 2-6.5 mm and the lattice structure has a thickness of approximately 0.5-2.5 mm.

In one embodiment, the support structure 155 includes numerous ribs 920, which may be evenly spaced about a periphery of the support structure 155. Between pairs of ribs 920 are slots 918, which may also be evenly spaced. As shown, the ribs 920 and slots 918 extend along a left side 906, right side 912 and bottom 910 of the support structure 155. Ribs 920 and slots 918 may also be formed along a top 905 of the support structure 155, though none are shown in support structure 155.

Each slot 918 may be sized to accept an IR emitter or an IR receiver, and may act as a window opening for an IR emitter or receiver. The slots may be positioned so that an IR emitter at one side (e.g., the right side 912) of the support structure 155 projects an IR beam from the backside through a slot 918, through the display, through another slot at an opposite side of the support structure 155, and into an IR receiver. The slots 918 enable the support structure to have a minimal size while still enabling room for the IR receivers and IR emitters.

In one embodiment, support structure 155 includes one or more conductive foam pieces. The conductive foam pieces may be configured to electrically couple the support structure 155 to the composite frame 118 so as to ground the support structure 155 to the composite frame 118.

Figure 14:
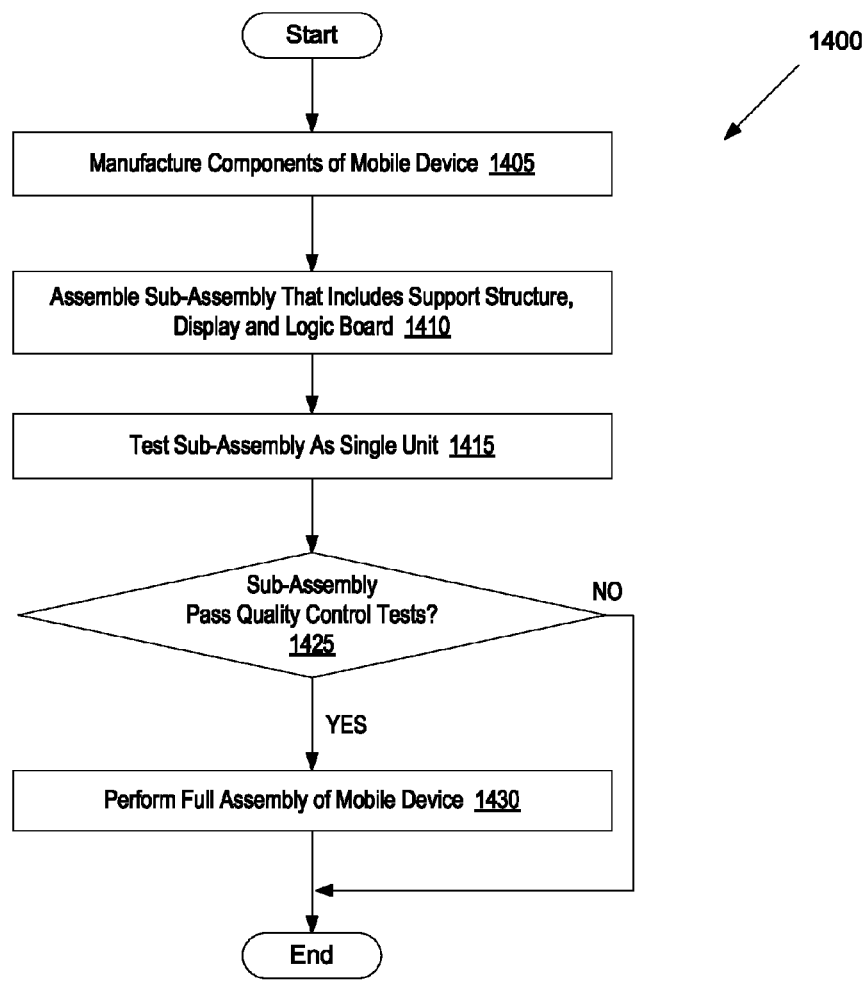
FIG. 14 is a flow diagram showing one embodiment of a process for assembling a mobile device using a composite frame and a support structure.

FIG. 14 is a flow diagram showing one embodiment of a process for assembling a mobile device using a composite frame and a support structure. At block 1405, some or all components that will be used to form a mobile device are manufactured. These components may include structural components such as a composite frame, support structure, front cover, back cover, and so forth. These components may also include electronic components such as a logic board, touch sensors, a display, a battery, and so forth.

At block 1410, a sub-assembly is assembled. The sub-assembly includes the support structure, a logic board mounted to a back side of the support structure, and a display mounted to a front side of the support structure. The sub-assembly may also include a battery mounted to the back side of the support structure, speakers mounted to a bottom of the support structure, a light guide mounted to the front side of the support structure, and/or an antenna mounted to a top of the support structure.

At block 1415, the sub-assembly is tested as a single unit. Use of the support structure enables the sub-assembly to be created, and further enables major electronic components of the mobile device to be tested as a single unit. This may simplify and speed up the testing and assembly process for the mobile device. A battery of quality control tests may be performed on the sub-assembly, that test the functionality of some or all of its components, including the display and the logic board. For example, a processor, memory, touch sensors, wireless modem and so forth included in the logic board may be tested, the display may be tested, etc.

At block 1425, the test results are analyzed to determine whether the sub-assembly passed the quality control tests (e.g., if each of the tested components included in the sub-assembly passed its associated battery of tests). If the sub-assembly passed the quality control tests, the method proceeds to block 1430, and the sub-assembly is coupled to a composite frame. A front and back cover are then coupled to the composite frame to fully assemble the mobile device. If the sub-assembly does not pass the quality control tests, then the parts of the sub-assembly that do not pass their associated battery of test may be swapped out, and the testing may be repeated. Otherwise, the sub-assembly may be scrapped and/or further reviewed by a quality control engineer.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A mobile device comprising:
    a composite frame comprising:
        a metal portion having a plurality of voids; and
        a glass impregnated plastic portion having a plurality of protrusions that fill the plurality of voids to form a mechanical bond to the metal portion;
    a back cover coupled to a back side of the composite frame; and
    a display coupled to a front side of the composite frame, wherein the composite frame frames the display, wherein:
        the metal portion comprises a plurality of parallel slots; and
        the glass impregnated plastic portion comprises:
            a plurality of receiving areas that receive hook features of a front cover; and
            a plurality of ribs that provide rigidity to the glass impregnated plastic portion.

2. The mobile device of claim 1, further comprising a plurality of electronic components that are at least one of housed within, framed by, or coupled to the composite frame.

3. The mobile device of claim 1, further comprising:
    an antenna that is covered by the glass impregnated plastic portion of the composite frame.

4. The mobile device of claim 1, wherein approximately 30% to approximately 70% of a volume of the glass impregnated plastic portion is composed of glass fibers.

5. The mobile device of claim 1, wherein the metal portion joins the glass impregnated plastic portion with a seamless joint.

6. The mobile device of claim 1, wherein the metal portion comprises at least one of magnesium or aluminum.

7. The mobile device of claim 1, wherein the metal portion has been formed via a die cast process and the glass impregnated plastic portion has been formed on the at least one side of the metal portion via a plastic injection molding process.

8. The mobile device of claim 1, wherein:
    the plurality of parallel slots are spaced approximately 2 mm apart and have thicknesses of approximately 1 mm.

9. A frame for a mobile device, the frame comprising:
    a metal region having a plurality of sides, wherein at least one side of the plurality of sides comprises a plurality of voids; and
    a plastic region, comprising glass impregnated plastic, having a mechanical bond to the at least one side of the metal region, wherein the mechanical bond is achieved via protrusions of the plastic region that fill the plurality of voids in the at least one side, wherein:
        the metal region comprises a plurality of parallel slots; and
        the plastic region comprises:
            a plurality of receiving areas that receive hook features of a front cover; and
            a plurality of ribs that provide rigidity to the plastic region.

10. The frame of claim 9, wherein approximately 30% to approximately 70% of a volume of the plastic region is composed of glass fibers.

11. The frame of claim 9, wherein the plastic region is configured to cover an antenna.

12. The frame of claim 9, wherein the metal region joins the plastic region with a seamless joint, and wherein the metal region has a hollow center.

13. The frame of claim 9, wherein the metal region comprises at least one of magnesium or aluminum.

14. The frame of claim 9, wherein the metal region has been formed via a die casting process and the plastic region has been formed on the at least one side of the metal region via a plastic injection molding process.

15. The frame of claim 9, wherein
    the plurality of parallel slots are spaced approximately 2 mm apart and have thicknesses of approximately 1 mm.

16. A process of manufacturing a composite frame for a mobile device, the process comprising:
    forming a metal portion of the composite frame, wherein the metal portion has a plurality of voids at an end of the metal portion, wherein the metal portion comprises a plurality of parallel slots;
    forming a glass impregnated plastic portion of the composite frame on the end of the metal portion via a plastic injection molding process, wherein the glass impregnated plastic portion has a plurality of protrusions that fill the plurality of voids to form a joint to the metal portion, and wherein the glass impregnated plastic portion comprises a plurality of receiving areas that receive hook features of a front cover and a plurality of ribs that provide rigidity to the glass impregnated plastic portion;
    correcting imperfections produced by the plastic injection molding process; and
    polishing the glass impregnated plastic portion, wherein after the polishing the joint between the metal portion and the glass impregnated plastic portion is approximately seamless.

17. The process of claim 16, further comprising
    painting the composite frame, wherein the metal portion and the glass impregnated plastic portion are visually indistinguishable.

18. The process of claim 16, wherein forming the glass impregnated plastic portion comprises:
    placing the metal portion into an insert molding machine;
    injecting liquid plastic into the insert molding machine, wherein the liquid plastic flows into the voids; and
    cooling the metal portion and the glass impregnated plastic portion before removing the composite frame from the insert molding machine.

19. The process of claim 16, wherein approximately 30% to approximately 70% of a volume of the glass impregnated plastic portion is composed of glass fibers.

20. The process of claim 16, wherein the metal portion comprises at least one of magnesium or aluminum, and wherein the metal portion is formed using a metal die casting process.

* * * * *